United States Patent [19]

Mackal

[11] Patent Number: 5,080,402
[45] Date of Patent: Jan. 14, 1992

[54] APPARATUS FOR JOINING AN INFLATION MANIFOLD TO AN INFLATABLE ARTICLE

[76] Inventor: Glenn H. Mackal, 4923 59th Ave. S., St. Petersburg, Fla. 33715

[21] Appl. No.: 523,153

[22] Filed: May 14, 1990

[51] Int. Cl.$^5$ .............................................. F16L 5/00
[52] U.S. Cl. ................................... 285/200; 285/284; 285/305; 285/330; 156/293
[58] Field of Search ............... 285/264, 200, 305, 190, 285/423, 330, 328, 229, 149, 921; 137/223, 224, 224.5, 226, 227, 228, 229, 230, 231, 232, 233, 234, 234.5; 156/293

[56] References Cited

U.S. PATENT DOCUMENTS

| 712,738 | 11/1902 | Stevens | 285/190 |
|---|---|---|---|
| 2,273,398 | 2/1942 | Couty et al. | 285/149 |
| 2,779,061 | 1/1957 | Hasking | 285/200 X |
| 3,754,731 | 8/1973 | Mackal et al. | 285/216 X |
| 4,077,456 | 3/1978 | Smith | 137/223 X |
| 4,317,471 | 3/1982 | King | 285/921 X |
| 4,600,221 | 7/1986 | Bimba | 285/319 X |
| 4,812,193 | 3/1989 | Gauron | 156/293 |
| 4,903,997 | 2/1990 | Kifer | 285/287 |

FOREIGN PATENT DOCUMENTS

| 1964860 | 7/1970 | Fed. Rep. of Germany | 285/200 |
|---|---|---|---|
| 966772 | 8/1964 | United Kingdom | 285/921 |

*Primary Examiner*—Dave W. Arola
*Attorney, Agent, or Firm*—Joseph C. Mason, Jr.; Ronald E. Smith

[57] ABSTRACT

An inflation manifold is made an integral part of an inflatable article so that the manifold is held against rotation and retraction. In a preferred embodiment, a "U"-shaped clip has plural apertures formed along its extent, and is snapped onto a preselected part of the manifold such as a neck part. A detent prevents relative rotation between the clip and the neck of the manifold. The clip and manifold are embedded in elastomeric material so that the elastomeric material flows into the apertures and into the space between the opposed ends of the clamp, thereby preventing rotation and retraction of the manifold and clip with respect to such material when the material hardens.

3 Claims, 1 Drawing Sheet

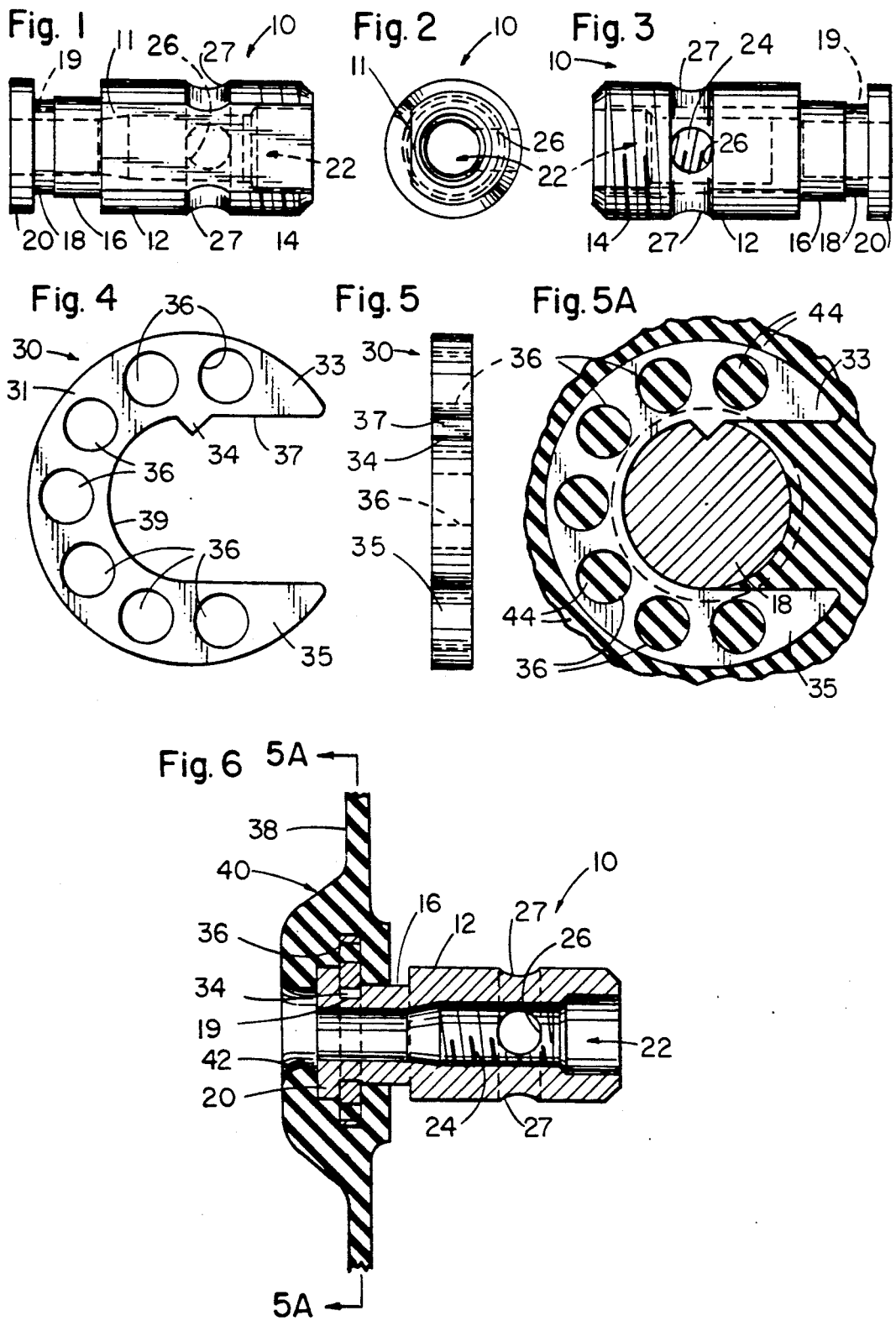

APPARATUS FOR JOINING AN INFLATION MANIFOLD TO AN INFLATABLE ARTICLE

TECHNICAL FIELD

This invention relates, generally, to methods for mounting inflation manifolds to inflatable articles so that the manifold is held against rotation and retraction.

BACKGROUND ART

Inflatable articles such as life vests, marker buoys, and the like are typically provided with a nozzle-like inflation manifold of metallic construction. The manifold has a first end in fluid communication with the interior cavity of the inflatable article and a second end adapted to be engaged by an inflator that contains a source of gaseous fluid under pressure.

Since most inflatable articles are formed by thin panels of elastomeric materials, the union between the manifold and the panel is problematic. Some manufacturers thicken the panel in the region of the inflation manifold and apply bonding agents in an effort to secure the manifold to the thickened panel. Other manufacturers use an attachment technique known as RF (radio frequency) welding.

Inflation manifolds, however, generally include nozzles having round cross sections. As is well known, round objects are easily rotated; thus, even when thickened panels and strong bonding and attachment techniques are employed, inflation manifolds tend to rotate and such rotation, of course, destroys the bond between manifold and panel and the inflated article loses gaseous fluid.

There is a need for a new manifold construction that is more resistant to rotation and retraction than the manifolds of the prior art, but the prior art, taken as a whole, neither teaches nor suggests how the limitations of the art could be overcome.

Moreover, the known manifold constructions are subject to alignment problems that may cause catastrophic failures to inflate. Specifically, if the manifolds of the prior art are rotationally or longitudinally misaligned with respect to a passageway formed in the inflator with which the manifold is used, such misalignment can prevent flow of gases from the gas cartridge to the inflatable article.

The prior art is devoid of suggestions as to how the misalignment problem could be solved.

DISCLOSURE OF INVENTION

The longstanding but heretofore unfulfilled need for a construction that better retains an inflation manifold against rotation and retraction and which overcomes the misalignment problem is now fulfilled in the form of a manifold held by a thin "U"-shaped clip member, of predetermined thickness, having a plurality of large apertures formed therein. The clip non-rotatably engages a neck part of the manifold and is embedded within a thickened wall of the inflatable article. The elastomeric material of the inflatable article flows into the large apertures formed in the clip and into the space between the opposite ends of the clip, thereby locking the clip and manifold against rotation and retraction. The misalignment problem is solved by an annular band that circumscribes the main body of the manifold.

Accordingly, the invention is new and useful. Moreover, it was not obvious to those of ordinary skill in the art at the time it was made, in view of the prior art, considered as a whole.

An important object of the invention is to provide economical and effective means for retaining an inflation manifold against rotation and retraction.

These and are objects and advantages will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is a side elevational view of the manifold part of the invention;

FIG. 2 is an end view of the manifold part of the invention;

FIG. 3 is the opposite side elevational view of FIG. 1;

FIG. 4 is a side elevational view of a retaining washer or clip;

FIG. 5 is an end view of the clip in FIG. 4;

FIG. 5A is a sectional view taken along line 5A—5A in FIG. 6; and

FIG. 6 is a cross-sectional view of the combined parts of the invention molded into the thickened part of the inflatable article.

Similar reference numerals refer to similar parts throughout the several views of the drawings.

BEST MODES FOR CARRYING OUT THE INVENTION

Referring now to FIG. 1, it will there be seen that an exemplary embodiment of the improved inflation manifold of this invention is denoted as a whole by the reference numeral 10.

Manifold 10 includes a main cylindrical body 12, a first end of which is provided with external threads 14. Flat 11 gives body 12 a "D"-shaped configuration when seen in end view as best shown in FIG. 2. A coaxial reduced diameter cylindrical part 16 extends from a second, opposite end thereof, and a coaxial cylindrical neck 18 of further reduced diameter extends from part 16.

Disc member or base 20 extends in coaxial alignment from neck 18, and has the same diameter as main body 12.

In a first embodiment, a recess 19 is formed in neck 18; in a second embodiment, not shown, a flat is formed in said neck. The function of the recess or flat is disclosed hereinafter.

A longitudinally extending bore 22 is formed in manifold 10 as shown and provides a fluid passageway therethrough; internal threads 24 are formed along a preselected extent thereof as perhaps best understood in connection with FIGS. 3 and 6.

An aperture or bore 26 is formed in main body 12 thereby defining a radially disposed bore that intersects bore 22. Bore 26 is usually formed diametrically opposite from flat 11, but design considerations or unintentional manufacturing variations may result in formation of bore 26 in non-diametric opposition to said flat. When this occurs, the passageway in the inflator that is intended to communicate with said bore 26 will misalign with said bore, thereby blocking the flow of gas into the inflatable article. The solution for this long unsolved problem will now be set forth.

A transverse band or groove 27 circumscribes main body 12, in at least partial registration with said bore 26. Groove 27 enables gaseous fluid to flow from the inflator through bore 26 even when bore 26 is rotationally or axially misaligned with the gas passageway formed in the inflator. Although band 27 is shown in complete registration with bore 26 and is shown having a longitudinal extent equal to the diameter of bore 26, the longitudinal extent of said bore 27 could be increased substantially and, again, only a part of said band 27 need be in registration with bore 26. Thus, band 27 accommodates both rotational and longitudinal misalignment between manifold 10 and the inflator with which it is used.

"U"-shaped clip 30, best shown in FIG. 4, has a thin body 31, as perhaps best depicted in FIG. 5, and is preferably of metallic construction. The opposite ends 33, 35 of clip 30 define a space 32 therebetween that serves an important function that will become more clear as this description proceeds.

A detent 34 is integrally formed with body 31 of the clip as shown and is received by the complementally formed recess 19 formed in neck 18 when the apparatus is assembled as depicted in FIG. 6. In an alternate embodiment, not shown, detent 34 is eliminated and flat surface 37 of clip 30 slidably engages the above-mentioned flat formed on neck 18. Either way, clip 30 is keyed onto neck 18 and held against relative rotation thereto.

In both embodiments, bight region 39 of clip 30 (FIG. 4) receives neck 18 when the clip is secured to manifold 10. In the first embodiment, the distance between opposing ends 33, 35 of clip 30 is substantially equal to (but slightly less than to secure a snug fit) the outer diameter of neck 18. Accordingly, detent 34 causes arms 33, 35 to transiently diverge from one another as the clip is slid onto neck 18, but once the detent 34 encounters its recess 19, the resilient arms 33, 35 return to their depicted equilibrium position and clip 30 is securely attached to neck 18. In the second embodiment, since the flat reduces the diameter of neck 18, opposing ends 33, 35 are closer together.

Plural, equidistantly and circumferentially spaced apertures 36 having a common diameter are formed in clip body 31 to save materials, and more importantly, to provide a unique anti-rotation function. As shown in FIG. 6, panel 38 of an inflatable article is thickened as at 40 to provide sufficient elastomeric material to which manifold 10 may be mounted. Opening 42 provides fluid communication between bore 22 formed in manifold 10 and the interior cavity of the inflatable article.

Importantly, clip 30 is first attached to manifold 10 and the thickened part 40 of panel 38 is molded around the manifold/clip assembly to provide the structure shown in FIG. 6. The elastomeric material of the inflatable article is flowable and as a result enters into each of the apertures 36 formed in body 31 of clip 30 and also enters into that part 44 of space 32 between opposing ends 33, 35 of clip 30 not occupied by neck 18 as clearly shown in FIG. 5A.

Thus, the cross-hatched region 44 is filled with elastomeric material when the molding process is over and it should be clear that clockwise or counterclockwise rotation of clip 30 in the plane of the paper is virtually impossible. Similarly, longitudinal travel (into or out of the plane of the paper) is equally impossible.

The thickness of clip 30 is carefully preselected because if it is too thin, the filling of spaces 44 would be futile and if it is too thick, it would be insufficiently embedded, i.e., it would not be covered by enough material, thereby again producing an imperfect anti-rotation means. The longitudinal extent of neck 18 of manifold 10 and the thickness of the clip body 31 are the same, as shown in FIG. 6. It should be clear from that FIG. that a strong lock is achieved and manifold 10 cannot be rotated when apertures 36 and area 44 are filled with hardened elastomeric material.

This invention pioneers the art of means for preventing rotation and retraction of inflation manifolds from elastomeric inflatable articles by locking mechanisms that become an integral part of the inflation manifold upon being attached thereto, and for that reason the claims that follow are entitled to broad interpretation, as a matter of law, to protect the heart or essence of the invention and not just the illustrated embodiment.

Retaining clips can take limitless forms, as can inflation manifolds. For example, clip 30 need not be flat as depicted; it can have a FIG. 5 profile of many differing configurations. Thus, it is the novel method of integrating the clip and manifold into the thickened part of the panel that forms the heart of this invention. The method, as has been seen, includes the steps of increasing the transverse surface area of the inflation manifold by securing a clip or flange thereto. The clip is preferably flat but may take any suitable predetermined configuration and can engage a neck part of the manifold or any other preselected part thereof. The clip or flange need not have a "U" or "C" configuration as shown herein, but could perhaps just as effectively be of annular configuration and thus completely circumscribe a preselected part of the manifold body. The number and size of apertures formed in the flat flange or clip need not be restricted to the size shown, nor need the apertures be of circular configuration since any predetermined geometrical configuration is within the contemplation of this invention.

The most significant teaching of the novel method, clearly, is that the flowability of the elastomeric material from which the inflatable article is formed can be harnessed to produce an inflatable article that is molded integrally with an inflation manifold so that rotation and retraction of the manifold is essentially impossible.

It should also be clear that clip 30 need not be provided as a separate part, but could be made an integral part of manifold 10. The purpose of clip 10 is, again, primarily to increase the transverse surface area of the manifold 10 to enable formation of the apertures that receive the flowable elastomeric material. The invention, accordingly, is not restricted to a clip that is formed separately from the manifold and then secured thereto. FIG. 6 should be interpreted, therefor, as showing an integrally formed manifold and flange structure.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An improvement to an inflation manifold, comprising:
    a retaining clip member adapted to be releasably secured to a preselected part of the manifold and said clip and said preselected part of said manifold provided with coacting means for preventing relative rotation therebetween;
    said clip member being of predetermined construction to increase the effective transverse cross-sectional extend of said manifold;
    said clip member having a generally "U"-shaped configuration;
    a plurality of apertures being formed in said clip member along its entire "U"-shaped extent;
    said clip member and a part of said manifold contiguous thereto being embedded in elastomeric material that forms an inflatable article;
    said elastomeric material being disposed in surrounding relation to said clip member and said contiguous part of said manifold and being disposed within said at least one aperture so that said elastomeric material holds said clip and hence said manifold against rotation and retraction.

2. An inflation manifold and retaining clip therefor, comprising:
    a cylindrical in configuration main body having a predetermined diameter;
    a cylindrical part having a reduced diameter relative to said predetermined diameter of said main body and being connected to and extending coaxially from said main body;
    a neck member of cylindrical configuration being connected to and extending coaxially from said reduced diameter cylindrical part;
    a recess of predetermined configuration being formed in said neck member;
    a head member of cylindrical configuration connected to and extending coaxially from said neck member, said head member having a diameter substantially equal to the predetermined diameter of said main body;
    a generally "U"-shaped clip member having transversely spaced apart opposite ends and a bight area therebetween;
    a radially inwardly extending detent member, being formed in said clip;
    said detent member being complementally formed relative to said recess formed in said neck to prevent relative rotation between said clip and manifold;
    said detent member being seated in said recess;
    said neck member abuttingly engaging said bight area when said detent member is seated in said recess;
    at least one aperture being formed in said clip;
    said clip and said neck member being embedded in elastomeric material that forms a part of an inflatable article; and
    said elastomeric material being disposed in filling relation to said at least one aperture and to a space between said opposite ends of said clip member so that said elastomeric material holds the clip member and hence the manifold against rotation and retraction.

3. The inflation manifold of claim 2, further comprising a radial bore formed in said main body and a transverse groove, of predetermined longitudinal extent, formed in said main body in at least partial registration with said radial bore.

* * * * *